(12) United States Patent
Leanza et al.

(10) Patent No.: US 9,187,136 B1
(45) Date of Patent: Nov. 17, 2015

(54) STRUCTURAL PAN FOR AUTOMOTIVE BODY/FRAME

(71) Applicant: Honda Motor Co., Ltd., Tokyo (JP)

(72) Inventors: Anthony John Leanza, Powell, OH (US); Manabu Ishizono, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/449,205

(22) Filed: Aug. 1, 2014

(51) Int. Cl.
*B62D 25/20* (2006.01)
*B62D 25/08* (2006.01)
*B62D 43/10* (2006.01)
*B62D 65/00* (2006.01)

(52) U.S. Cl.
CPC .............. *B62D 25/20* (2013.01); *B62D 25/087* (2013.01); *B62D 25/2009* (2013.01); *B62D 43/10* (2013.01); *B62D 65/00* (2013.01); *B60G 2206/604* (2013.01)

(58) Field of Classification Search
CPC .......................... B60G 2206/604; B62D 25/20
See application file for complete search history.

(56) References Cited

U.S. PATENT DOCUMENTS

| | | | | |
|---|---|---|---|---|
| 5,020,846 | A * | 6/1991 | Bonnett ...................... | 296/181.4 |
| 5,129,700 | A * | 7/1992 | Trevisan et al. .......... | 296/193.07 |
| 5,501,289 | A * | 3/1996 | Nishikawa et al. .......... | 180/68.5 |
| 5,619,784 | A * | 4/1997 | Nishimoto et al. ............. | 29/430 |
| 6,428,085 | B1 * | 8/2002 | Miyasaka et al. ........ | 296/187.12 |
| 6,905,165 | B2 * | 6/2005 | Kawabe et al. .......... | 296/193.07 |
| 7,195,306 | B2 * | 3/2007 | Egawa et al. ............ | 296/187.08 |
| 7,401,669 | B2 * | 7/2008 | Fujii et al. .................... | 180/65.1 |
| 7,527,326 | B2 * | 5/2009 | Egawa et al. ............ | 296/193.07 |
| 7,954,887 | B2 | 6/2011 | Sakamoto et al. | |
| 8,079,435 | B2 * | 12/2011 | Takasaki et al. ............. | 180/68.5 |
| 8,651,549 | B2 | 2/2014 | Raffel et al. | |
| 8,696,051 | B2 * | 4/2014 | Charbonneau et al. ....... | 296/209 |
| 8,833,839 | B2 * | 9/2014 | Young et al. ............. | 296/187.12 |
| 8,870,272 | B2 * | 10/2014 | De Luca .................. | 296/193.07 |
| 8,960,776 | B2 * | 2/2015 | Boettcher et al. ........ | 296/193.07 |
| 8,967,672 | B2 * | 3/2015 | Kurogi et al. ................. | 280/788 |
| 9,045,030 | B2 * | 6/2015 | Rawlinson et al. | |
| 2004/0119276 | A1 * | 6/2004 | Fior et al. ...................... | 280/781 |
| 2005/0116460 | A1 * | 6/2005 | McGill et al. ................. | 280/781 |
| 2011/0300426 | A1 * | 12/2011 | Iwasa et al. ..................... | 429/99 |
| 2011/0300427 | A1 * | 12/2011 | Iwasa et al. ..................... | 429/99 |
| 2012/0153673 | A1 | 6/2012 | De Luca | |

(Continued)

FOREIGN PATENT DOCUMENTS

| | | |
|---|---|---|
| EP | 1820716 | 8/2007 |
| JP | 4612464 | 1/2011 |
| KR | 2010035946 | 4/2010 |

*Primary Examiner* — Nicole Verley
(74) *Attorney, Agent, or Firm* — Rankin, Hill & Clark LLP

(57) ABSTRACT

A vehicle body includes a pair of laterally spaced longitudinal side rails, a first cross member and a second cross member. Each cross members spans between and interconnects the side rails. A multi-piece well includes a well floor having a first side, a second side opposite the first side, a first end, and a second end opposite the first end. A first frame side support is secured to the first side of the well floor and a second frame side support is secured to the second side of the well floor. The first and second frame side supports define opposite side walls of the well. A first frame end support is secured to the first end of the well floor and a second frame end support is secured to the second end of the well floor. The first and second frame end supports define opposite end walls of the well.

19 Claims, 8 Drawing Sheets

(56) References Cited

U.S. PATENT DOCUMENTS

2012/0156539 A1* 6/2012 Honjo et al. .................. 429/100
2013/0118823 A1 5/2013 Pohl et al.
2013/0313863 A1* 11/2013 Yamaji et al. ............ 296/203.01
2014/0300141 A1* 10/2014 Hihara et al. ............ 296/193.07
2014/0327268 A1* 11/2014 Mori ........................ 296/187.08
2014/0338997 A1* 11/2014 Okada et al. .................. 180/68.5
2015/0144414 A1* 5/2015 Tanigaki et al. ............... 180/291
2015/0145287 A1* 5/2015 Harwin et al. ............ 296/193.07

* cited by examiner

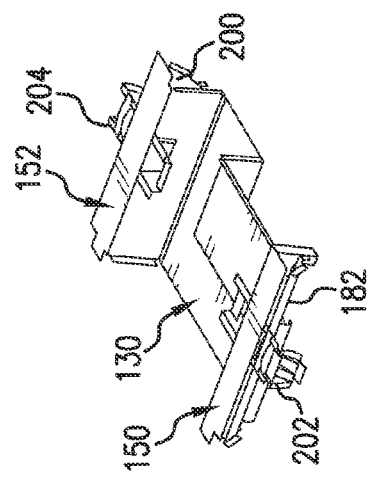
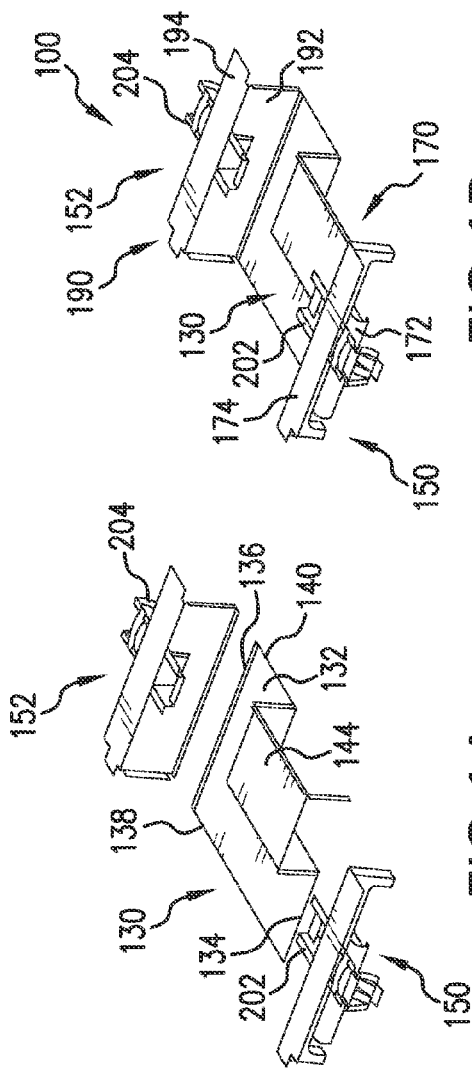
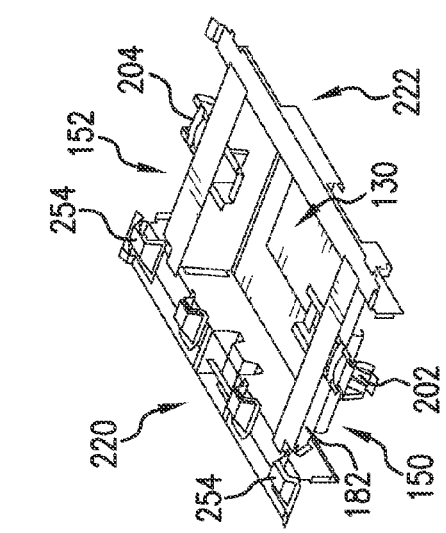
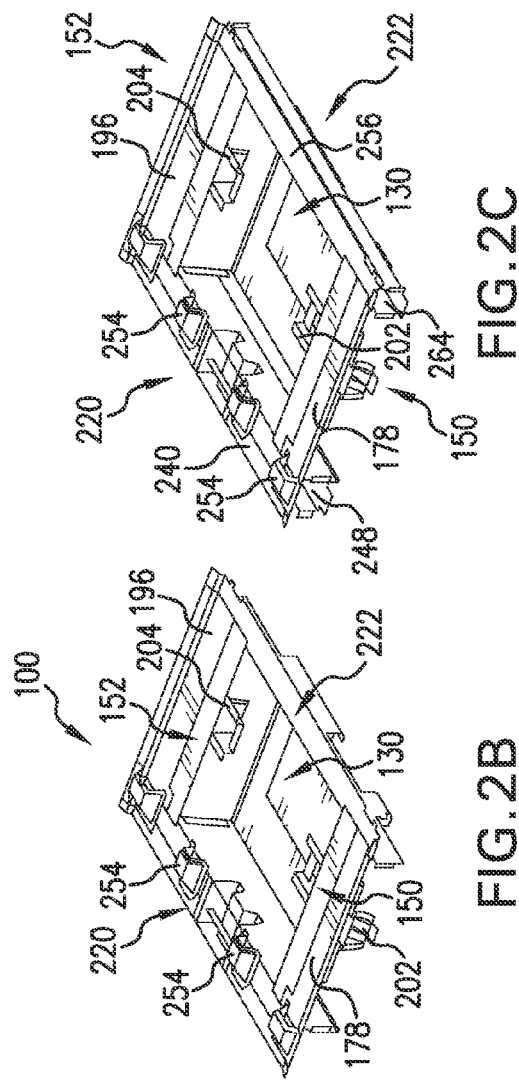

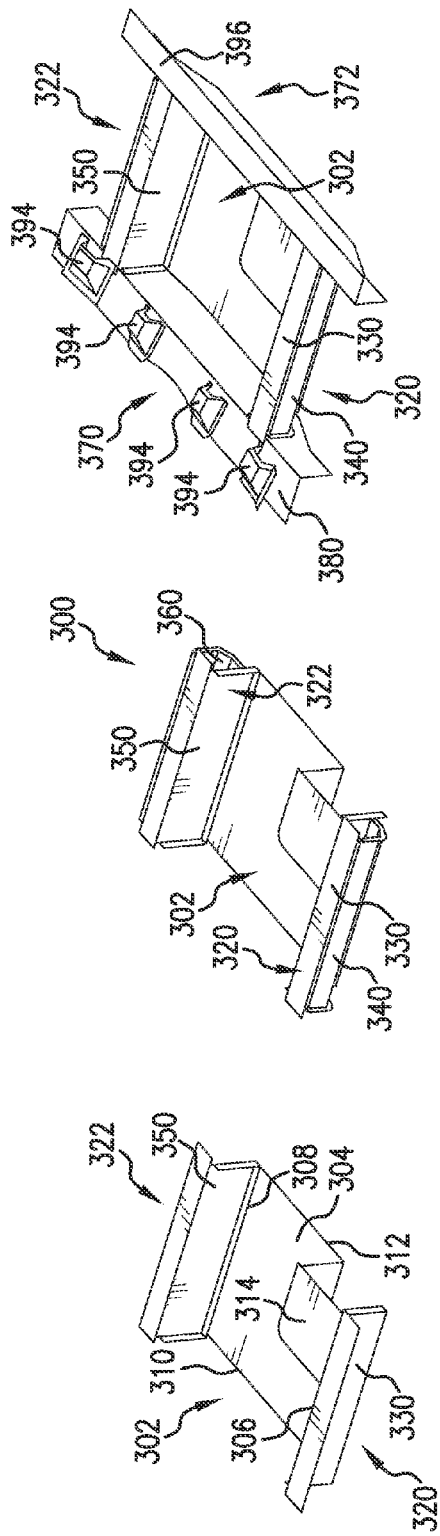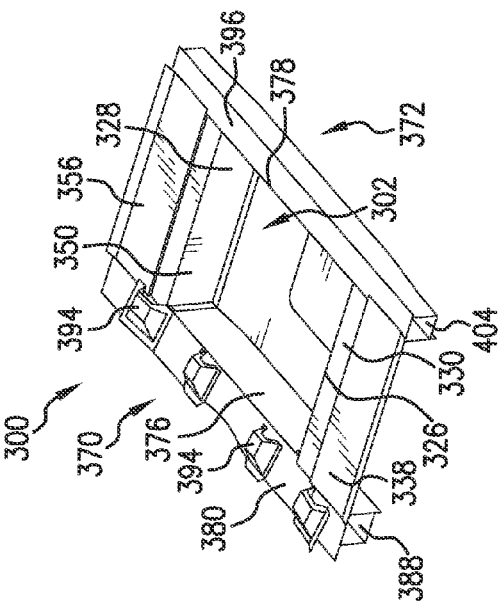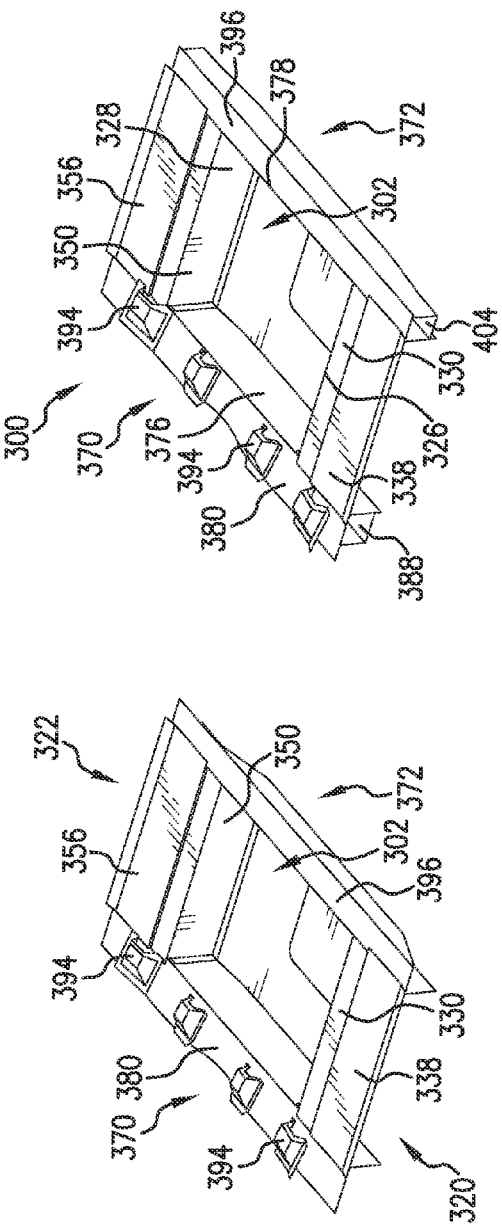

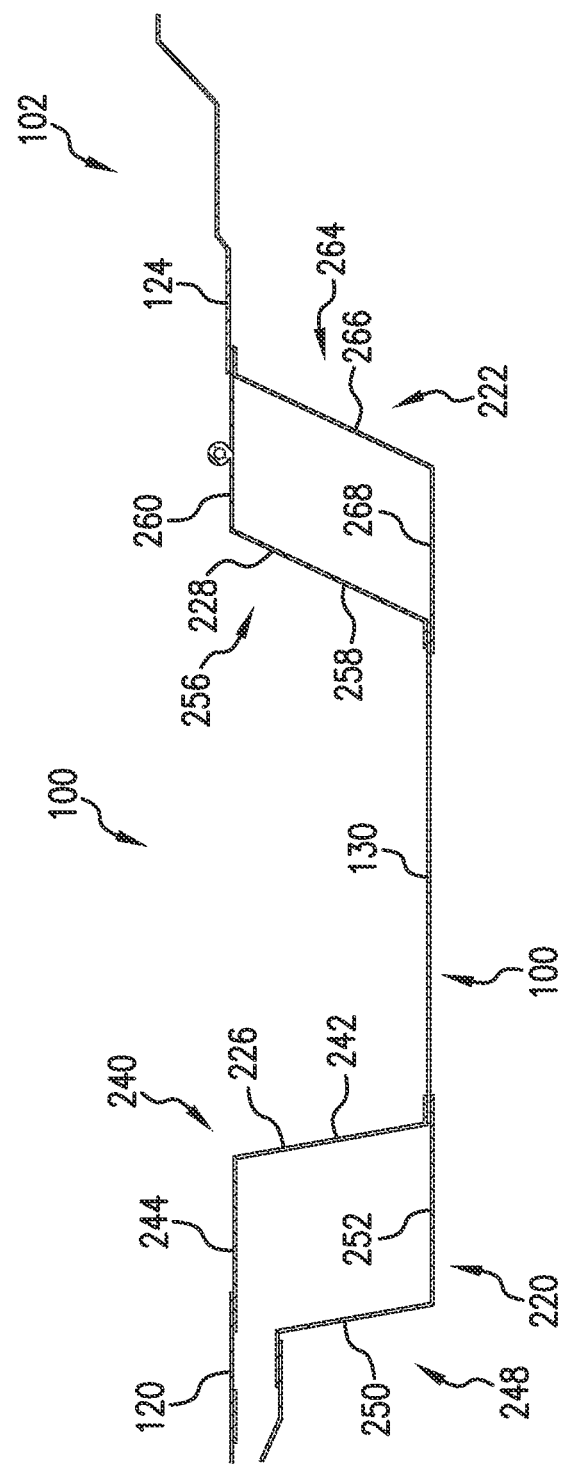

STRUCTURAL PAN FOR AUTOMOTIVE BODY/FRAME

BACKGROUND

A typical automotive body/frame includes longitudinal rails connected to one another by one or more cross members in the rear region of the vehicle body, e.g., in order to form a closed vehicle frame. In this respect, the position of each cross member is varied in the longitudinal direction of the vehicle and adapted to the respective configuration of the motor vehicle or the motor vehicle type. It is also known to provide wells or pans in automotive bodies, such as, for example, trunk wells and spare-tire wells. One known well configuration is a one-piece deep-drawn part which is secured in an opening located in a floor panel of secured to the frame. The opening in the floor panel can be flanked by the cross members but the one-piece well itself does not form part of the structural body/frame and the overall benefit to body rigidity and strength for the one-piece deep-drawn part is minimal. Further, this known one-piece deep-drawn well design provides for an increased tooling and process cost.

BRIEF DESCRIPTION

In accordance with one aspect, a vehicle body comprises a pair of laterally spaced longitudinal side rails, a first cross member and a second cross member longitudinally spaced from the first cross member. Each of the first and second cross members spans between and interconnects the side rails. A multi-piece well includes a well floor having a first side, a second side opposite the first side, a first end, and a second end opposite the first end. A first frame side support is secured to the first side of the well floor and a second frame side support is secured to the second side of the well floor. The first and second frame side supports define opposite side walls of the well. A first frame end support is secured to the first end of the well floor and a second frame end support is secured to the second end of the well floor. The first and second frame end supports define opposite end walls of the well.

In accordance with another aspect, a vehicle body has a pair of laterally spaced longitudinal side rails and cross members spanning between and interconnecting the side rails. A multi-piece well for the vehicle body comprises a well floor having a first side, a second side opposite the first side, a first end, and a second end opposite the first end. A first frame side support is secured to the first side of the well floor and a second frame side support is secured to the second side of the well floor. The first and second frame side supports define opposite side walls of the well. A separate first frame end support is secured to the first end of the well floor and a separate second frame end support is secured to the second end of the well floor. The first and second frame end supports define opposite end walls of the well.

In accordance with yet another aspect, a frame construction method for forming a vehicle frame comprises providing a pair of laterally spaced longitudinal frame rails; connecting a first cross member to the frame rails; connecting a second cross member to the frame rails; and forming a well on the vehicle frame. The well includes a well floor, first and second end walls and first and second side walls. The forming step includes securing a first end of the well floor to the first cross member where the first cross member defines the first end wall of the well, securing a second end of the well floor to the second cross member where the second cross member defines the second end wall of the well, providing a first frame side support where the first frame side support defines the first side wall of the well, and providing a second frame side support where the second frame side support defines the second side wall of the well. The method further comprises connecting the first frame side support to one of the side rails and connecting the second frame side support to the other of the side rails.

BRIEF DESCRIPTION OF THE DRAWINGS

FIGS. 1A-2C depict an assembly of an exemplary multi-piece well of a vehicle body according to one aspect of the present disclosure.

FIGS. 3A-3E depict an assembly of an exemplary multi-piece well for a vehicle body according to another aspect of the present disclosure.

FIG. 6 is a longitudinal cross sectional view of a vehicle body including the multi-piece well of the present disclosure.

DETAILED DESCRIPTION

It should, of course, be understood that the description and drawings herein are merely illustrative and that various modifications and changes can be made in the structures disclosed without departing from the present disclosure. In general, the figures of the exemplary structural pan for an automotive body/frame are not to scale. It will also be appreciated that the various identified components of the exemplary structural pan for an automotive body/frame disclosed herein are merely terms of art that may vary from one manufacturer to another and should not be deemed to limit the present disclosure. As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 4:
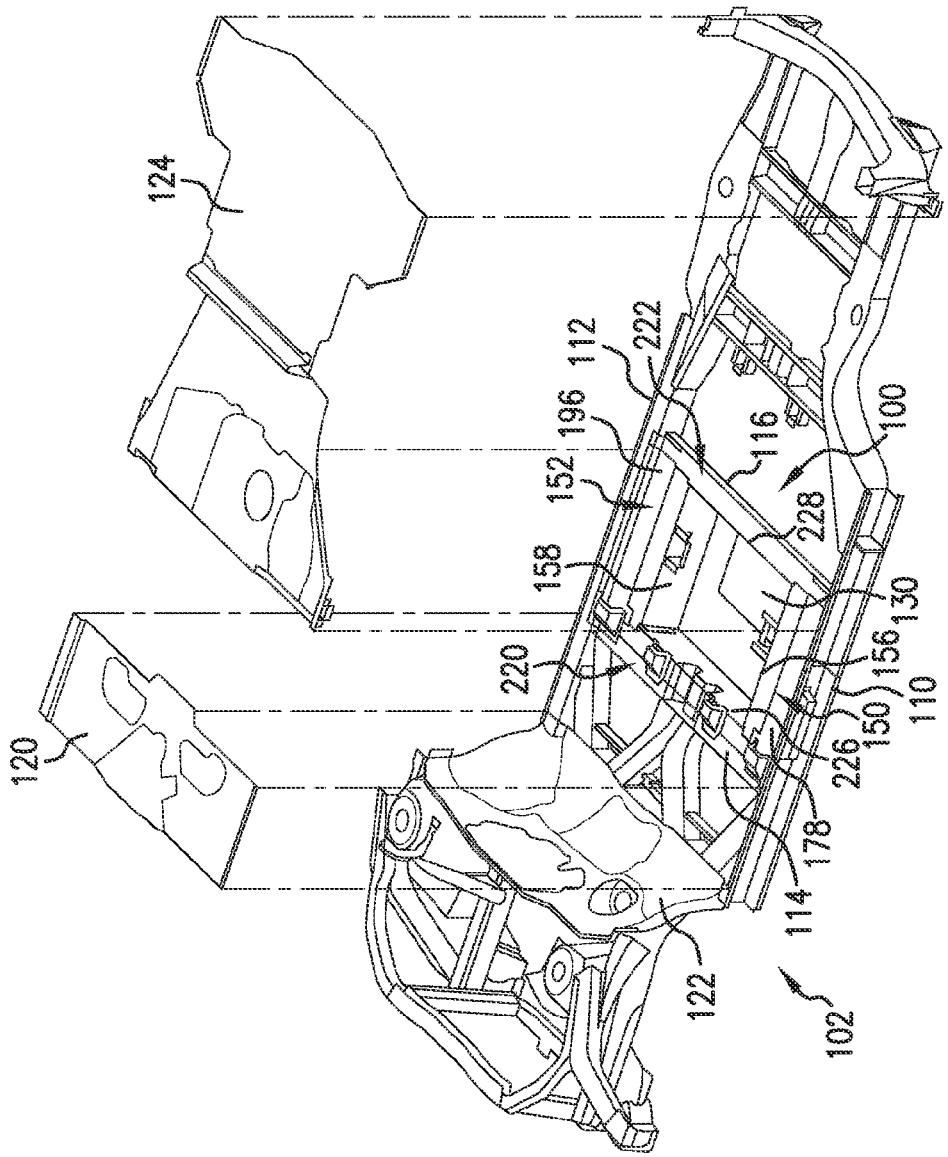
FIG. 4 is a partially exploded perspective view of a vehicle body including the exemplary multi-piece well of FIG. 2C.

Referring now to the drawings, wherein like numerals refer to like parts throughout the several views, FIG. 4 illustrates an exemplary multi-piece well 100 for a vehicle body or frame 102 according to one aspect of the present disclosure. The vehicle body 102 includes a pair of laterally spaced longitudinal side rails 110 and 112. A first cross member 114 and a second cross member 116 longitudinally spaced from the first cross member 114 span between and interconnect the side rails 110, 112. The vehicle body 102 further includes a front floor panel 120 positioned between the multi-piece well 100 and a firewall 122 and secured to the side rails 110, 112 and the first cross member 114. A separate rear floor panel 124 is located rearward of the multi-piece well 100 and secured to the side rails 110, 112 and the second cross member 116.

FIGS. 1A-2D illustrate the structural components that form the multi-piece well 100 for the vehicle body 102. The multi-piece well 100 includes a well floor 130 which is defined by a substantially planar base 132. The base 132 includes a first side 134 and a second side 136 opposite the first side 134 in a lateral direction of the vehicle body 102. The base 132 further includes a first end 138 and a second end 140 opposite the first end 138 in a longitudinal direction of the vehicle body 102. A raised platform 144 can be provided on the base 132 of the well floor 130; although, this is not required. If so provided on the well floor 130, and according to one aspect, the platform 144 can be integrally formed with the base 132. Although, it should be appreciated that the platform 144 can be a separate member attached to the base 132. As shown, the platform 144 is located at the intersection of the first side 134 and the second end 140 of the base 132. However, it should be appreciated that if so provided on the well floor 130, the platform 144 can be located elsewhere on the base 132.

The multi-piece well 100 further includes a first frame side support 150 and a second frame side support 152 located opposite the first frame side support in a lateral direction of the vehicle body 102. As depicted, according to one embodiment, the first frame side support 150 is separate from the well floor 130 and is secured to the first side 134 of the well floor base 132. The second frame side support 152 can be also separate from the well floor 130 and is secured to the second side 136 of the well floor base 132. Although, it should be appreciated that the first and second frame side supports 150, 152 can be at least partially formed integrally with the well floor base 132. The first and second frame side supports 150, 152 define opposite side walls 156, 158 of the multi-piece well 100 (FIG. 4). Further, as shown in FIG. 4, the first frame side support 150 is configured to be secured to one of the side rails (i.e., side rail 110) along a length of the first frame side support, and the second frame side support 152 is configured to be secured to the other of the side rails (i.e., side rail 112) along a length of the second frame side support.

Figure 2D:
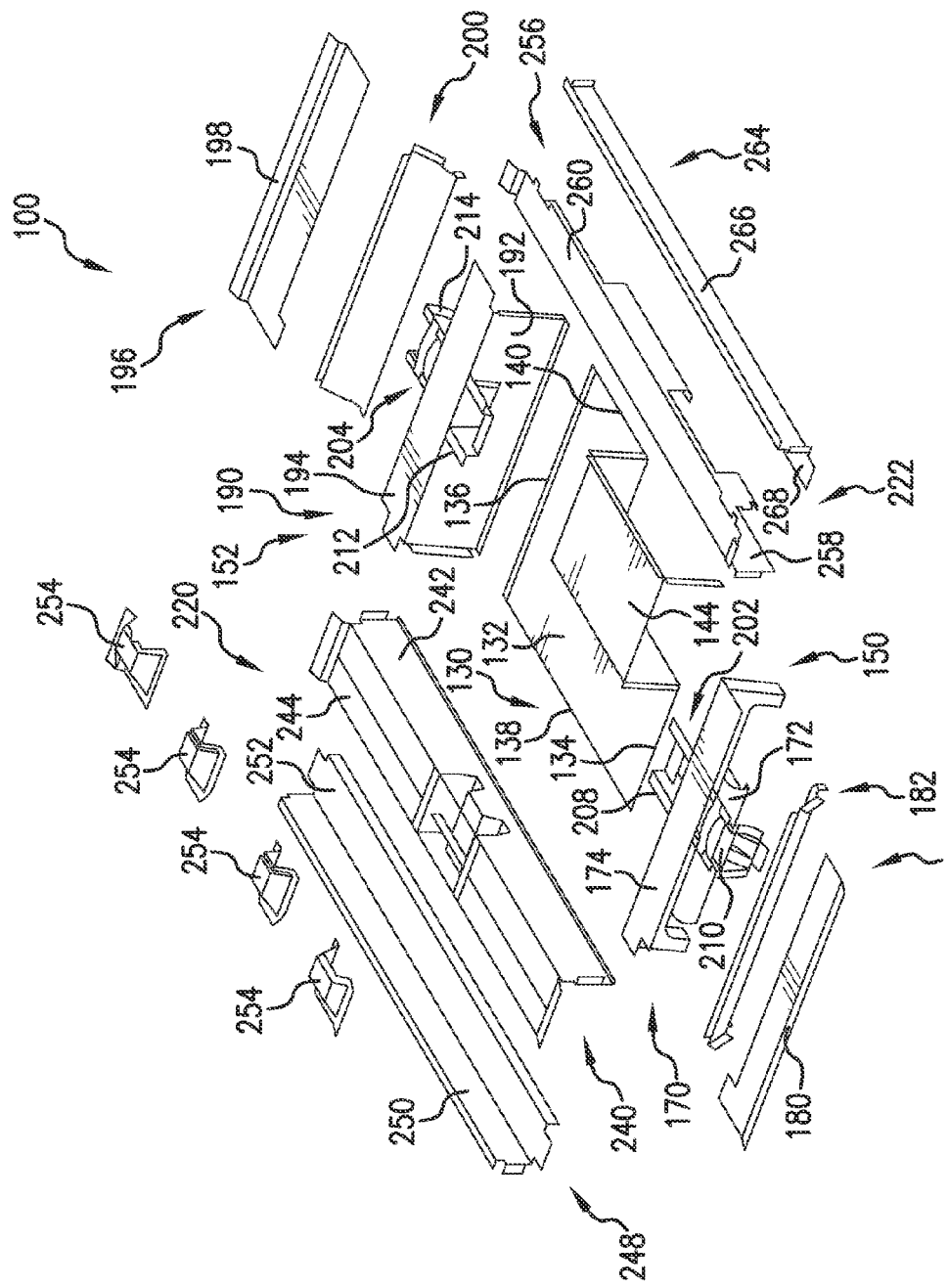
FIG. 2D is an exploded perspective view of the multi-piece well of FIG. 2C.

Particularly, the first frame side support 150 includes a first support member 170 which can be separate from or formed integrally with the base 132. The first support member 170 can be L-shaped in cross-section having a first portion 172 defining one of the side walls of the well 100 (i.e., side wall 156) and a second portion 174. The first support member 170. A second support member 178 of the first frame side support 150 is secured to the second portion 174 of the first support member 170. As depicted in FIG. 4, the second support member 178 interconnects the side rail 110 and the second portion 172 and bridges a gap between the side rail 110 and the side wall 156 of the well 100. As shown, a flanged side 180 of the second support member 178 is directly secured to side rail 110. According to one aspect, and as depicted in FIG. 2D, the second support member 178 is separate from the first support member 170; although, it should be appreciated that the first and second support member 170, 178 can define a unitary, one-piece support member. The first frame side support 150 can further include a third support member 182. The third support member 182 can be L-shaped in cross-section and is configured to interconnect the first and second portions 172, 174 of the first support member 170. With the configurations of the first support member 170 and third support member 182, the first frame side support 150 defines an elongated open-ended box-shaped structural support component for both the well 100 and the vehicle body 102.

Similarly, the second frame side support 152 includes a first support member 190 which can also be separate from or formed integrally with the base 132. The first support member 190 can be L-shaped in cross-section having a first portion 192 defining one of the side walls of the well 100 (i.e., side wall 158) and a second portion 194. A second support member 196 of the second frame side support 152 is secured to the second portion 194 of the first support member 190. The second support member 196 interconnects the side rail 112 and the second portion 194 and bridges a gap between the side rail 112 and the side wall 158 of the well 100. As shown, a flanged side 198 of the second support member 196 is directly secured to the side rail 112. According to one aspect, and as depicted in FIG. 2D, the second support member 196 is separate from the first support member 190; although, it should be appreciated that the first and second support member 190, 196 can define a unitary, one-piece support member. The second frame side support 152 can further include a third support member 200. The third support member 200 can be L-shaped in cross-section and is configured to interconnect the first and second portions 192, 194 of the first support member 190 of the second frame side support 152. Again, with the configurations of the first and third support members 190, 200, the second frame side support 152 defines an elongated open-ended box-shaped structural support component for both the well 100 and the vehicle body 102.

According to one aspect, the multi-piece well 100 can further include bulk heads or bridge members 202, 204 which provide further support to the respective first and second frame side supports 150, 152. As shown, the bulk head 202 can extend through an opening located in the first portion 172 of the first support member 170 such that one end portion 208 of the bulk head 202 extends over the base 132 and an opposite end portion 210 of the bulk head 202 extends laterally outwardly from the first support member 170. The end portion 210 of the bulk head 202 can be secured to an underside of the third support member 182 and can be also secured to the side rail 110 so that the bulk head 202 provides further support and rigidity to the side wall 156 of the well 100. The bulk head 204 also extends through an opening provided in the first portion 192 of the first support member 190 and has an end portion 212 suspended over the base 132 and an opposite end portion 214 extending laterally outwardly from the first support member 190. The end portion 214 of the bulk head 204 is secured to an underside of the third support member 196 and can be connected to the side rail 112 such that the bulk head 204 provides further support and rigidity to the side wall 158 of the multi-piece well 100.

With continued reference to FIGS. 2A-2D, the exemplary multi-piece well 100 further includes a first frame end support 220 and a second frame end support 222 spaced longitudinally from the first frame end support 220. As depicted, the first frame end support 220 is separate from the well floor 130 and is secured to the first end 138 of the well floor base 132. The second frame end support 222 is also separate from the well floor 130 and is secured to the second end 140 of the well floor base 132. The first and second frame end supports 220, 222 define opposite end walls 226, 228 of the multi-piece well 100 (FIG. 4). Further, as shown in FIG. 4, the first and second frame end supports 220, 222 are configured to define the respective first and second cross members 114, 116, and the end sections of each of the first and second frame end supports 220, 222 are directly secured to the side rails 110, 112.

Particularly, the first frame end support 220 includes a first support member 240 which can be L-shaped in cross-section having a first portion 242 and a second portion 244. The first portion 242 of the first support member 240 defines one of the end walls of the well 100 (i.e., end wall 226). The first frame end support 220 further includes a second support member 248 secured to the first support member 240. The second support member 248 can also be L-shaped in cross-section and has a first portion 250 spaced from and extending substantially parallel to the first portion 242 of the first support member 240 and a second portion 252 spaced from and extending substantially parallel to the second portion 244 of the first support member 240. The first and second support members 240, 248 of the first frame end support 220 together define the first cross member 114 and form an elongated open-ended box-shaped structural support component for the well 100 and vehicle body 102. Additional vehicle body frame structural members 254, such a seat mounts, can be secured to the second portion 244 of the first support member 220.

Similarly, the second frame end support 222 includes a first support member 256 which can be L-shaped in cross-section having a first portion 258 defining one of the end walls of the well 100 (i.e., end wall 228) and a second portion 260. A second support member 264 of the second frame end support 222 is secured to the first support member 256. The second support member 264 can also be L-shaped in cross-section and has a first portion 266 spaced from and extending substantially parallel to the first portion 258 of the first support member 256 and a second portion 268 spaced from and extending substantially parallel to the second portion 260 of the first support member 256. Again, with the second support member 264 secured to the first support member 256, the second frame end support 222 defines the second cross member 116 of the vehicle body 102 and forms an elongated open-ended box-shaped structural support component for the well 100 and the vehicle body 102.

With reference back to FIG. 4, the multi-piece well 100 is positioned between the side rails 110, 112. Each of the first frame side support 150 and second frame side support 152 is secured to one of the side rails 110, 112 along a respective length of each first frame side support and second frame side support. The first and second frame end supports 220, 222 at least partially form the respective first and second cross members 114, 116, and end sections of each of the first frame end support 220 and second frame end support 222 are secured to the side rails 110, 112. The front floor panel 120 is secured to the side rails 110, 112 and the first frame end support 220 and the separate rear floor panel 124 is secured to the side rails 110, 112 and the second frame end support 222.

Figure 3F:
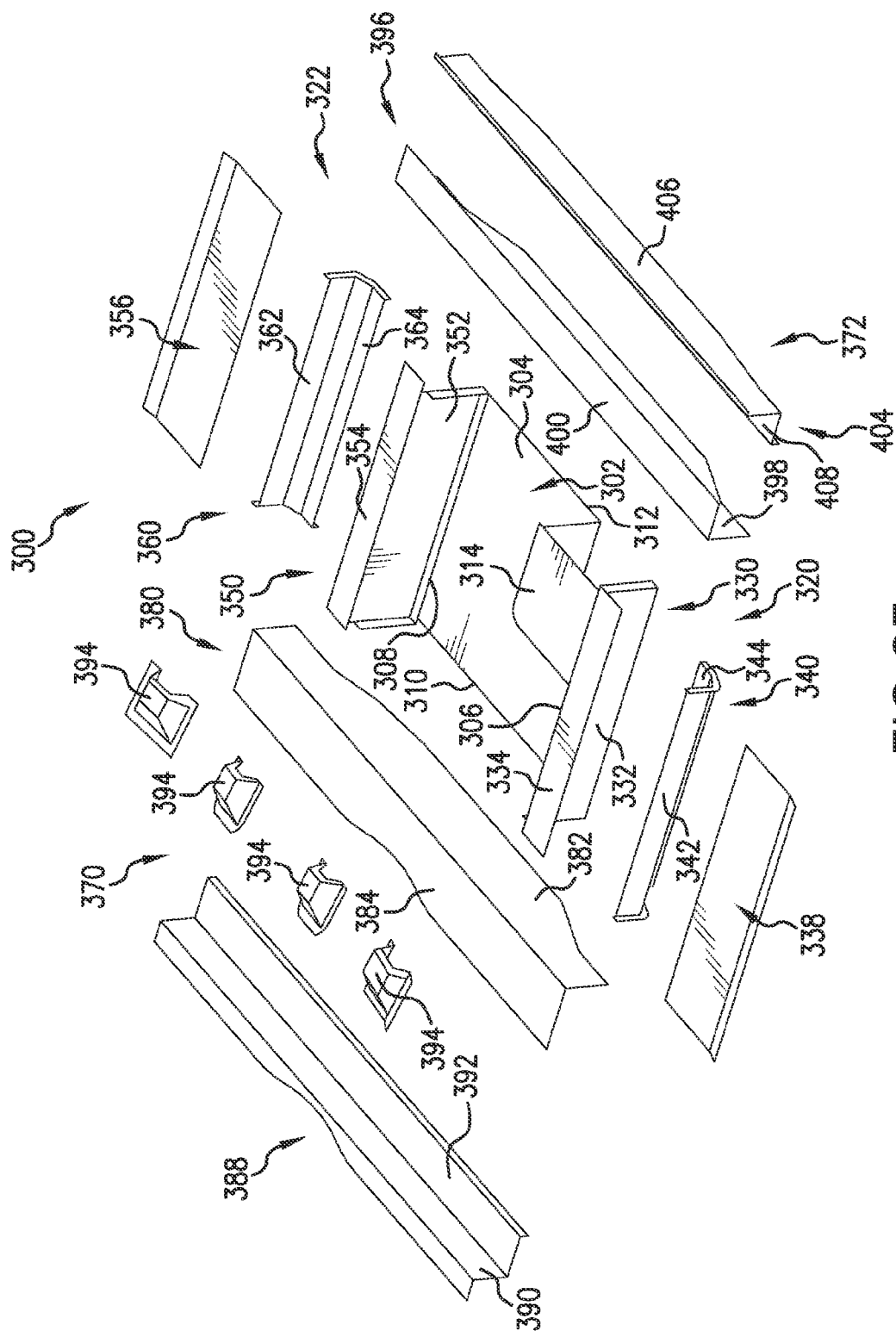
FIG. 3F is an exploded view of the multi-piece well of FIG. 3E.

FIGS. 3A-3F illustrate the structural components that form an exemplary multi-piece well 300 for the vehicle body 102 according to another aspect of the present disclosure. The multi-piece well 300 includes a well floor 302 which is defined by a substantially planar base 304. The base 304 includes a first side 306 and a second side 308 opposite the first side 306 in a lateral direction of the vehicle body 102. The base 304 further includes a first end 310 and a second end 312 opposite the first end 310 in a longitudinal direction of the vehicle body 102. A raised platform 314 can be provided on the base 306 of the well floor 302; although, this is not required. The multi-piece well 300 further includes a first frame side support 320 and a second frame side support 322 located opposite the first frame side support in a lateral direction of the vehicle body 102. As depicted, the first frame side support 320 is separate from the well floor 302 and is secured to the first side 306 of the well floor base 304. The second frame side support 322 also separate from the well floor 302 and is secured to the second side 308 of the well floor base 304. Although, it should be appreciated that the first and second frame side supports 320, 322 can be at least partially formed integrally with the well floor base 304. The first and second frame side supports 320, 322 define opposite side walls 326, 328 of the multi-piece well 300 (FIG. 3E). The first frame side support 320 is configured to be secured to one of the side rails (i.e., side rail 110) along a length of the first frame side support, and the second frame side support 352 is configured to be secured to the other of the side rails (i.e., side rail 112) along a length of the second frame side support.

Similar to the first frame side support 150 of the multi-piece well 100, the first frame side support 320 includes a first support member 330 which can be separate from or formed integrally with the base 304. The first frame side support 320 can be L-shaped in cross-section having a first portion 332 defining one of the side walls of the well 300 (i.e., side wall 326) and a second portion 334. A second support member 338 of the first frame side support 320 is secured to the second portion 334 of the first support member 330. The second support member 338 can be separate from or formed as part of the first support member 330. The second support member 338 interconnects the side rail 110 and the side wall 326 of the well 300. The first frame side support 320 can further include a third support member 340. The third support member 340 can be L-shaped in cross-section and is configured to interconnect the first and second portions 332, 334 of the first support member 330. As shown in FIG. 3F, the third support member 340 has a first portion 342 spaced from and extending substantially parallel to the first portion 332 of the first support member 330 and a second portion 344 spaced from and extending substantially parallel to the second portion 334 of the first support member 330. With the configurations of the first support member 330 and third support member 340, the first frame side support 320 defines an elongated open-ended box-shaped structural support component for both the well 300 and the vehicle body 102.

The second frame side support 322 includes a first support member 350 which can also be separate from or formed integrally with the base 304. The first support member 350 can be L-shaped in cross-section having a first portion 352 defining one of the side walls of the well 300 (i.e., side wall 328) and a second portion 354. A second support member 356 of the second frame side support 322 is secured to the second portion 354 of the first support member 350. The second support member 356 can be separate from or formed as part of the first support member 350. The second support member 356 interconnects the side rail 112 and the side wall 328 of the well 300. The second frame side support 322 can further include a third support member 360. The third support member 360 can be L-shaped in cross-section and is configured to interconnect the first and second portions 352, 354 of the first support member 350. As shown in FIG. 3F, the third support member 360 has a first portion 362 spaced from and extending substantially parallel to the first portion 352 of the first support member 350 and a second portion 364 spaced from and extending substantially parallel to the second portion 354 of the first support member 350. With the configurations of the first support member 350 and third support member 360, the second frame side support 322 defines an elongated open-ended box-shaped structural support component for both the well 300 and the vehicle body 102.

With continued reference to FIGS. 3A-3F, the exemplary multi-piece well 300 further includes a first frame end support 370 and a second frame end support 372 spaced longitudinally from the first frame end support 370. As depicted, the first frame end support 370 is separate from the well floor 302 and is secured to the first end 310 of the well floor base 304. The second frame end support 372 is also separate from the well floor 302 and is secured to the second end 312 of the well floor base 304. The first and second frame end supports 370, 372 define opposite end walls 376, 378 of the multi-piece well 100 (FIG. 3E). Similar to the well 100, the first and second frame end supports 370, 372 are configured to define the respective first and second cross members 114, 116, and the end sections of each of the first and second frame end supports 370, 372 are directly secured to the side rails 110, 112.

Similar to the first frame end support 220 of the multi-piece well 100, the first frame end support 370 includes a first support member 380 which can be L-shaped in cross-section having a first portion 382 and a second portion 384. The first portion 382 of the first support member 380 defines one of the end walls of the well 300 (i.e., end wall 376). The first frame end support 370 further includes a second support member 388 secured to the first support member 380. The second support member 388 can also be L-shaped in cross-section and has a first portion 390 spaced from and extending substantially parallel to the first portion 382 of the first support member 380 and a second portion 392 spaced from and extending substantially parallel to the second portion 384 of the first support member 380. The first and second support members 380, 388 of the first frame end support 370 together define the first cross member 114 and form an elongated open-ended box-shaped structural support component for the well 300 and vehicle body 102. Additional vehicle body frame structural members 394, such a seat mounts, can be secured to the second portion 384 of the first support member 380.

The second frame end support 372 includes a first support member 396 which can be L-shaped in cross-section having a first portion 398 defining one of the end walls of the well 300 (i.e., end wall 378) and a second portion 400. A second support member 404 of the second frame end support 372 is secured to the first support member 396. The second support member 404 can also be L-shaped in cross-section and has a first portion 406 spaced from and extending substantially parallel to the first portion 398 of the first support member 396 and a second portion 408 spaced from and extending substantially parallel to the second portion 400 of the first support member 396. Again, with the second support member 404 secured to the first support member 396, the second frame end support 372 defines the second cross member 116 of the vehicle body 102 and forms an elongated open-ended box-shaped structural support component for the well 300 and the vehicle body 102.

Figure 5:
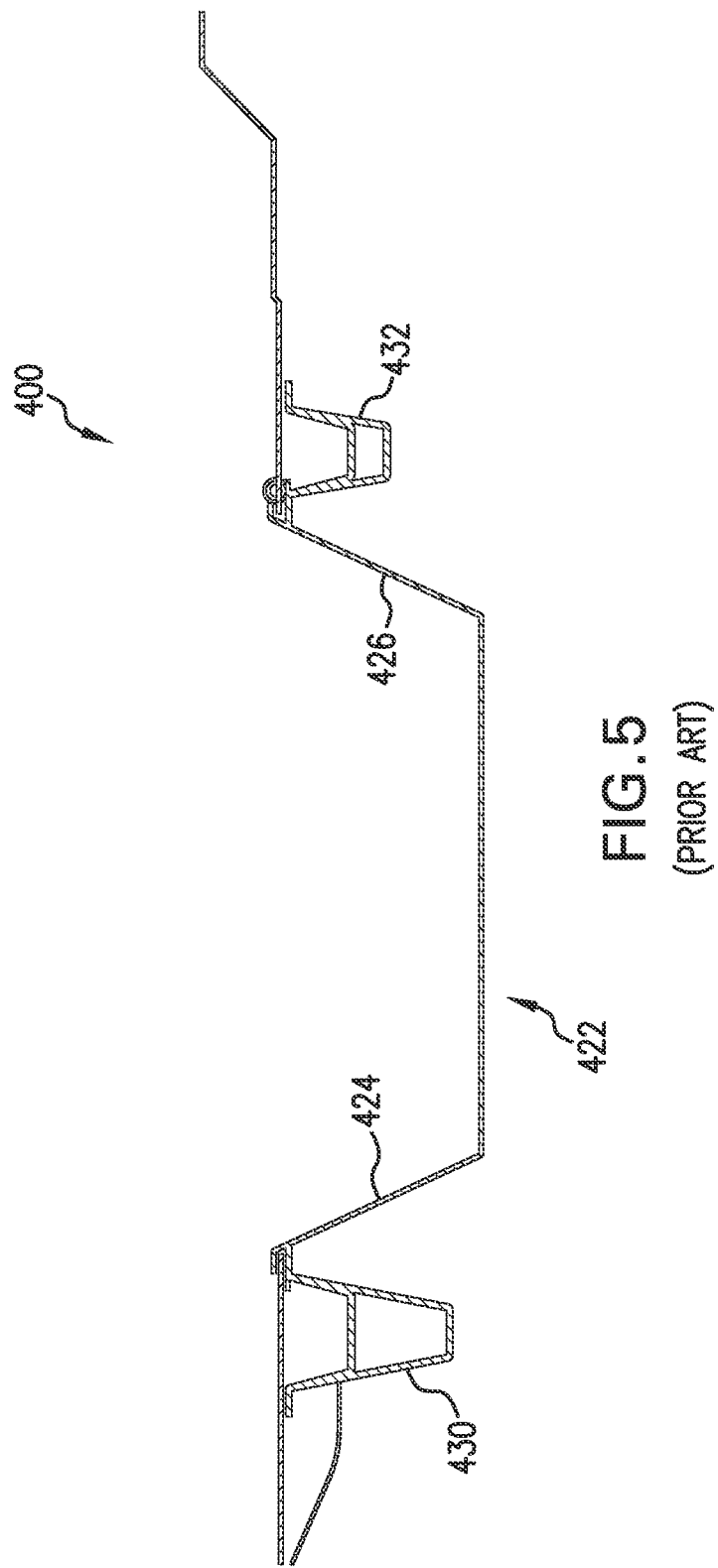
FIG. 5 is a longitudinal cross sectional view of a vehicle body including a known one-piece deep-drawn well.

FIG. 5 is a cross-sectional view of a vehicle body 420 having a known one piece deep-drawn well 422. End walls 424, 426 of the well 422 are secured to separate cross members 430, 432 spanning between side rails (not shown). To accommodate the one piece well 422, the cross members 430, 432 have reduced dimensions. FIG. 6 is a cross-section of the multi-piece well 100. The cross members 114, 116, which are formed by the first and second frame end supports 220, 222, define the end walls 226, 228 of the well 100 and also provide for larger dimensions as compared to the known design. The larger dimensioned cross members result in improved body/frame strength and rigidity. The multi-piece well 100 also allows for weight reduction to be achieved due to the section improvement of the cross members while maintaining or improving body/frame performance. Therefore, in order to eliminate the cost of tooling and manufacturing of the one piece deep-drawn well 422 and to improve the strength and rigidity of the vehicle body 102, the exemplary multi-piece well 100 is a modular design that is formed of several structural frame members welded together.

Figure 8:
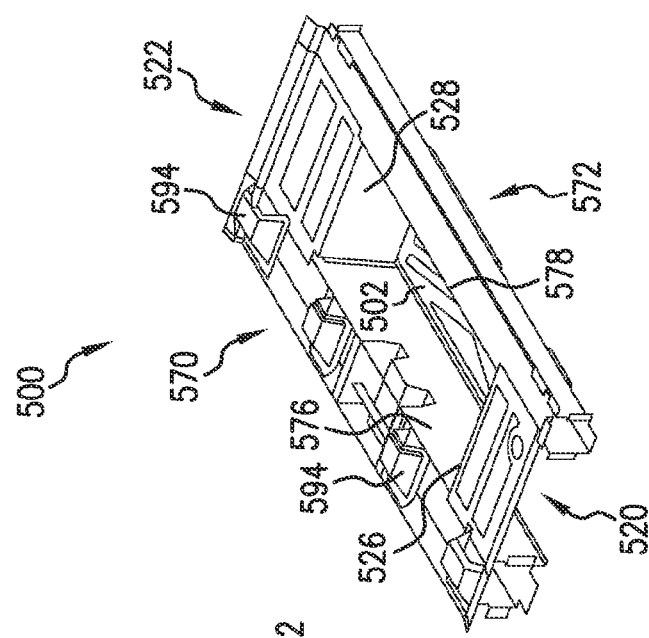
FIG. 8 is a perspective view of the multi-piece well of FIG. 7 in an assembled condition.
Figure 7:
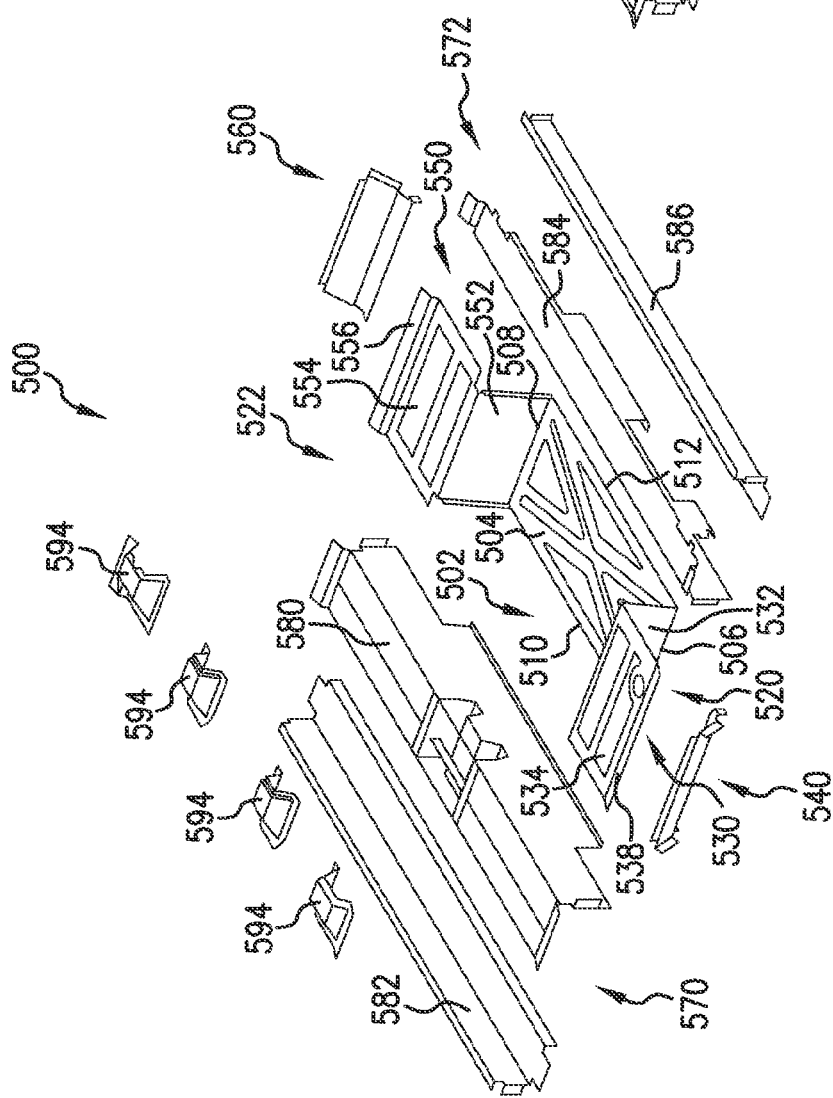
FIG. 7 is an exploded perspective view of an exemplary multi-piece well according to yet another aspect of the present disclosure.

FIGS. 7 and 8 illustrate the structural components that form an exemplary multi-piece well 500 for the vehicle body 102 according to yet another aspect of the present disclosure. The multi-piece well 500 includes a well floor 502 which is defined by a substantially planar base 504. The base 504 includes a first side 506 and a second side 508 opposite the first side 506 in a lateral direction of the vehicle body 102. The base 504 further includes a first end 510 and a second end 512 opposite the first end 510 in a longitudinal direction of the vehicle body 102. The multi-piece well 500 further includes a first frame side support 520 and a second frame side support 522 located opposite the first frame side support in a lateral direction of the vehicle body 102. As depicted, each of the first frame side support 520 and second frame side support 522 at least partially formed integrally with the well floor base 504 to define a unitary, one piece member. The first and second frame side supports 520, 522 define opposite side walls 526, 528 of the multi-piece well 500. The first frame side support 520 is configured to be secured to one of the side rails (i.e., side rail 110) along a length of the first frame side support, and the second frame side support 552 is configured to be secured to the other of the side rails (i.e., side rail 112) along a length of the second frame side support.

The first frame side support 520 includes a first support member 530 formed integrally with the base 504. The first support member 530 can be L-shaped in cross-section having a first portion 532 defining one of the side walls of the well 500 (i.e., side wall 526) and a second portion 534. A flange 538 of the first frame side support 520 interconnects the side rail 110 and the first frame side support 520. The first frame side support 520 can further include a second support member 540. The second support member 540 can be L-shaped in cross-section and is configured to interconnect the first and second portions 532, 534 of the first support member 530. With the configurations of the first support member 530 and second support member 540, the first frame side support 520 defines an elongated open-ended box-shaped structural support component for both the well 500 and the vehicle body 102.

The second frame side support 522 includes a first support member 550 formed integrally with the base 504. The first support member 550 can be L-shaped in cross-section having a first portion 552 defining one of the side walls of the well 500 (i.e., side wall 528) and a second portion 554. A flange 556 of the second frame side support 522 interconnects the side rail 112 and the second frame side support 522. The second frame side support 522 can further include a second support member 560. The second support member 560 can be L-shaped in cross-section and is configured to interconnect the first and second portions 552, 554 of the first support member 550. With the configurations of the first support member 550 and second support member 560, the second frame side support 522 defines an elongated open-ended box-shaped structural support component for both the well 500 and the vehicle body 102.

With continued reference to FIGS. 7 and 8, the exemplary multi-piece well 500 further includes a first frame end support 570 and a second frame end support 572 spaced longitudinally from the first frame end support 570. As depicted, the first frame end support 570 is separate from the well floor 502, includes a first support member 580 and a second support member 582, and is secured to the first end 510 of the well floor base 504. The second frame end support 572 is also separate from the well floor 502, includes a first support member 584 and a second support member 586, and is secured to the second end 512 of the well floor base 504. The first and second frame end supports 570, 572 define opposite end walls 576, 578 of the multi-piece well 100. Similar to the multi-piece wells 100, 300, the first and second frame end supports 570, 572 are configured to define the respective first and second cross members 114, 116, and the end sections of each of the first and second frame end supports 570, 572 are directly secured to the side rails 110, 112. Additional vehicle body frame structural members 594, such a seat mounts, can be secured to the first frame end support 570. It should be appreciated that the features of the first and second frame end supports 570, 572 are similar to the respective first and second frame end supports of each of the multi-piece wells 100, 300. Therefore, further description of the first and second frame end supports 570, 572 will be omitted for conciseness.

The present disclosure further provides an exemplary frame construction method for forming a vehicle body or frame 102. The frame construction method comprises providing a pair of laterally spaced longitudinal frame rails 110, 112; connecting a first cross member 114 to the frame rails 110, 112; connecting a second cross member 116 to the frame rails 110, 112; and forming a well 100, 300, 500 on the vehicle frame 102. The well 100, 300, 500 includes a well floor 130, 302, 502, a first side wall 156, 326, 526, a second side wall 158, 328, 528, a first end wall 226, 376, 576, and a second end wall 228, 378, 578. The forming step includes securing a first end of the well floor 130, 302, 502 to the first cross member 114 where the first cross member defines the first end wall 226, 376, 576 of the well 100, 300, 500, securing a second end of the well floor 130, 302, 502 to the second cross member 116 where the second cross member defines the second end wall 228, 378, 578 of the well 100, 300, 500, providing a first frame side support 150, 320, 520 where the first frame side support defines the first side wall 156, 326, 526 of the well 100, 300, 500, and providing a second frame side support 152, 322, 522 where the second frame side support defines the second side wall 158, 328, 528 of the well 100, 300, 500. The method further comprises connecting the first frame side support 150, 320, 520 to one of the side rails 110, 112 and connecting the second frame side support 152, 322, 522 to the other of the side rails 110, 112.

The exemplary frame construction method further comprises securing a first side of the well floor 130, 302 to the first frame side support 150, 320, and securing a second side of the well floor 130, 302 to the second frame side support 152, 322. The exemplary frame construction method further comprises providing a first support member 178, 338 for interconnecting the first frame side support 150, 320 to the one side rail, and providing a second support member 196, 356 for interconnecting the second frame side support 152, 322 to the other side rail. The exemplary frame construction method further comprises securing a front floor panel 120 to the side rails 110, 112 and one of the first and second cross members 114, 116, and securing a rear floor panel 122 to the side rails and the other of the first and second cross members.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle body comprising:
a pair of laterally spaced longitudinal side rails;
a first cross member and a second cross member longitudinally spaced from the first cross member, each of the first and second cross members spanning between and interconnecting the side rails; and
a multi-piece well including:
a well floor having a first side, a second side opposite the first side, a first end, and a second end opposite the first end,
a first frame side support secured to the first side of the well floor and a second frame side support secured to the second side of the well floor, the first and second frame side supports being separate from the side rails and having first support members L-shaped in cross-section defining opposite side walls of the well which are spaced inwardly from the side rails in a lateral direction of the vehicle body,
a first frame end support secured to the first end of the well floor and a second frame end support secured to the second end of the well floor, the first and second frame end supports defining opposite end walls of the well.

2. The vehicle body of claim 1, wherein each of the first and second frame side supports is separate from the well floor.

3. The vehicle body of claim 1, wherein the first frame side support is secured to one of the side rails and the second frame side support is secured to the other of the side rails.

4. The vehicle body of claim 3, wherein each of the first and second frame side supports includes:
the first support member having a first portion defining one of the side walls of the well and a second portion, and
a second support member secured to the second portion of the first support member, the second support member being directly secured to one of the side rails.

5. The vehicle body of claim 4, wherein each of the first and second frame side supports further includes a third support member configured to interconnect the first and second portions of the first support member.

6. The vehicle body of claim 1, wherein each of the first and second frame end supports is separate from the well floor.

7. The vehicle body of claim 6, wherein end sections of each of the first and second frame end supports are secured to the side rails.

8. The vehicle body of claim 7, wherein each of the first and second frame end supports includes:
a first support member having a first portion defining one of the end walls of the well and a second portion, and
a second support member secured to the first support member, the second support member having a first portion spaced from and extending substantially parallel to the first portion of the first support member and a second portion spaced from and extending substantially parallel to the second portion of the first support member.

9. The vehicle body of claim 8, wherein the first and second support members of the first frame end support define the first cross member, and the first and second support members of the second frame end support define the second cross member.

10. The vehicle body of claim 1, wherein the first and second frame side supports are formed integrally with the well floor, and the first and second frame end supports are separate structural components of the well.

11. The vehicle body of claim 10, wherein the first and second frame end supports at least partially form the respective first and second cross members.

12. The vehicle body of claim 1, further including a front floor panel secured to the side rails and one of the first and second frame end supports and a separate rear floor panel secured to the side rails and the other of the first and second frame end supports.

13. A multi-piece well for a vehicle body having a pair of laterally spaced longitudinal side rails and cross members spanning between and interconnecting the side rails, the well comprising:
a well floor having a first side, a second side opposite the first side, a first end, and a second end opposite the first end;
a first frame side support secured to the first side of the well floor and a second frame side support secured to the second side of the well floor, the first and second frame side supports defining opposite side walls of the well; and a separate first frame end support secured to the first end of the well floor and a separate second frame end support secured to the second end of the well floor, the first and second frame end supports defining opposite end walls of the well, wherein each of the first and second frame end su orts includes:

a first support member being L-shaped in cross-section and having a first portion defining one of the end walls of the well and a second portion, and a second su ort member being L-shaped in cross-section and having a first position secured to the second portion of the first support member and a second portion secured to the first portion of the first support member.

14. The well of claim 13, wherein each of the first frame side support and second frame side support is secured to one of the side rails along a respective length of each first frame side support and second frame side support, and end sections of each of the first frame end support and second frame end support are secured to the side rails.

15. The well of claim 13, wherein each of the first and second frame side supports includes:
   a first support member being L-shaped in cross-section and having a first portion defining one of the side was of the well and a second portion, and
   a second support member secured to the second portion of the first support member, the second support member bridging a gap between the second portion and one of the side rails, the second support member being secured to the one side rail, and
   a third support member configured to interconnect the first and second portions of the first support member.

16. The well of claim 13, wherein the first frame end support forms part of one cross member of the vehicle body and the second frame end support forms part of another cross member of the vehicle body.

17. A frame construction method for forming a vehicle frame, comprising:
   providing a pair of laterally spaced longitudinal frame rails;
   connecting a first cross member to the frame rails;
   connecting a second cross member to the frame rails; and
   forming a well on the vehicle frame, the well including a well floor, first and second end walls and first and second side walls, wherein the forming step includes:
      securing a first end of the well floor to the first cross member where the first cross member defines the first end wall of the well,
      securing a second end of the well floor to the second cross member where the second cross member defines the second end wall of the well, wherein each of the first and second cross members includes:
         a first support member being L-shaped in cross-section and having a first portion defining one of the end walls of the well and a second portion, and
         a second support member being L-shaped in cross-section and having a first portion secured to the second portion of the first support member and a second portion secured to the first portion of the first support member
      providing a first frame side support where the first frame side support defines the first side wall of the well,
      providing a second frame side support where the second frame side support defines the second side wall of the well; and
   connecting the first frame side support to one of the side rails; and
   connecting the second frame side support to the other of the side rails.

18. The method of claim 17, further comprising:
   securing a first side of the well floor to the first frame side support;
   securing a second side of the well floor to the second frame side support;
   providing a first support member for interconnecting the first frame side support to the one side rail, and
   providing a second support member for interconnecting the second frame side support to the other side rail.

19. The method of claim 17, further comprising:
   securing a front floor panel to the side rails and one of the first and second cross members, and
   securing a rear floor panel to the side rails and the other of the first and second cross members.

* * * * *

UNITED STATES PATENT AND TRADEMARK OFFICE
CERTIFICATE OF CORRECTION

PATENT NO.        : 9,187,136 B1
APPLICATION NO.   : 14/449205
DATED             : November 17, 2015
INVENTOR(S)       : Anthony John Leanza et al.

It is certified that error appears in the above-identified patent and that said Letters Patent is hereby corrected as shown below:

In The Claims

Claim 13: Column 11, line 9, "su orts" should read "supports"
Claim 13: Column 11, line 14, "su ort" should read "support"
Claim 13: Column 11, line 15, "and having a first position", should read "and having a first portion"
Claim 15: Column 11, line 27, "...of the side was", should read "...of the side walls"

Signed and Sealed this
Twelfth Day of April, 2016

Michelle K. Lee
*Director of the United States Patent and Trademark Office*